(12) United States Patent
Prados

(10) Patent No.: US 9,696,607 B2
(45) Date of Patent: Jul. 4, 2017

(54) CAMERA SHUTTER

(71) Applicant: HERE Global B.V., Veldhoven (NL)

(72) Inventor: Michael Prados, Oakland, CA (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/642,015

(22) Filed: Mar. 9, 2015

(65) Prior Publication Data
US 2016/0266471 A1 Sep. 15, 2016

(51) Int. Cl.
| | |
|---|---|
| H04N 5/225 | (2006.01) |
| G03B 9/60 | (2006.01) |
| H04N 5/235 | (2006.01) |
| G03B 7/00 | (2014.01) |
| G03B 9/08 | (2006.01) |

(52) U.S. Cl.
CPC .............. *G03B 9/60* (2013.01); *G03B 7/00* (2013.01); *G03B 7/003* (2013.01); *G03B 9/08* (2013.01); *H04N 5/2254* (2013.01); *H04N 5/2353* (2013.01)

(58) Field of Classification Search
CPC ... G03B 9/60; G03B 7/00; G03B 9/08; H04N 5/2353
USPC ........................................................ 348/367
See application file for complete search history.

(56) References Cited

U.S. PATENT DOCUMENTS

| | | | | |
|---|---|---|---|---|
| 4,273,429 A * | 6/1981 | Arisaka | ................... | G03B 7/08 396/251 |
| 4,319,211 A * | 3/1982 | Ueda | ....................... | G03B 9/08 335/229 |
| 4,763,155 A * | 8/1988 | Oda | ......................... | G03B 7/10 396/235 |
| 4,942,415 A | 7/1990 | Felle et al. | ................. | 354/234.1 |
| 5,122,702 A | 6/1992 | Nakazato | ........................ | 310/13 |
| 5,539,488 A | 7/1996 | Erickson et al. | ............. | 324/129 |
| 5,822,629 A * | 10/1998 | O'Brien | .................... | G03B 9/62 396/235 |
| 6,418,278 B1 | 7/2002 | Bittner | ......................... | 396/195 |
| 6,597,870 B2 * | 7/2003 | Kameyama | .............. | G03B 9/02 396/179 |
| 6,655,859 B2 | 12/2003 | Kamata | ........................ | 396/449 |
| 7,628,554 B2 | 12/2009 | Wernersson | .................. | 396/463 |
| 8,137,012 B2 | 3/2012 | Huang | .......................... | 396/463 |

(Continued)

FOREIGN PATENT DOCUMENTS

JP 2006047835 A 2/2006

OTHER PUBLICATIONS

"ReVue SloMo Sports Replay", http://photographytraining.tpub.com/14209/css/14209_326.htm; Dec. 8, 2014, 2 pgs.

*Primary Examiner* — Lin Ye
*Assistant Examiner* — Chan Nguyen
(74) *Attorney, Agent, or Firm* — Lempia Summerfield Katz LLC

(57) ABSTRACT

An apparatus including a camera shutter having a shutter window therethrough; a shutter drive connected to the camera shutter; and an aperture member having an aperture therethrough. The shutter drive includes at least one magnet and at least one coil. The shutter drive is configured to move the camera shutter when the coil is activated. The shutter window is sized and shaped to be moved into registry with the aperture. The shutter window is substantially at least as large as the aperture.

20 Claims, 6 Drawing Sheets

(56) References Cited

U.S. PATENT DOCUMENTS

2007/0177049 A1* 8/2007 Kreysar ............... G01J 1/04
348/368
2014/0184896 A1* 7/2014 Imafuji ............... G03B 7/16
348/371

* cited by examiner

CAMERA SHUTTER

BACKGROUND

Technical Field

The exemplary and non-limiting embodiments relate generally to a camera and, more particularly, to a shutter of a camera.

Brief Description of Prior Developments

In a digital camera, a camera shutter blocks light from an image sensor until the shutter is moved to allow the light to pass. The length of time the shutter allows light to pass may be set by an adjustable shutter speed.

SUMMARY

The following summary is merely intended to be exemplary. The summary is not intended to limit the scope of the claims.

In accordance with one aspect, an example apparatus comprises a camera shutter comprising a shutter window therethrough; a shutter drive connected to the camera shutter, where the shutter drive comprises at least one magnet and at least one coil, where the shutter drive is configured to move the camera shutter when the coil is activated; and an aperture member comprising an aperture therethrough, where the shutter window is sized and shaped to be moved into registry with the aperture, and where the shutter window is substantially at least as large as the aperture.

In accordance with another aspect, an example method comprises determining velocity of a camera shutter, where the camera shutter comprises a shutter window which is substantially at least as large as a camera aperture; and based upon the determined velocity of the camera shutter, adjusting a shutter drive to change the velocity of the camera shutter.

In accordance with another aspect, an example non-transitory program storage device readable by a machine is provided, tangibly embodying a program of instructions executable by the machine for performing operations, the operations comprising: determining velocity of a camera shutter; and based upon the determined velocity of the camera shutter, adjusting a shutter drive to change the velocity of the camera shutter.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
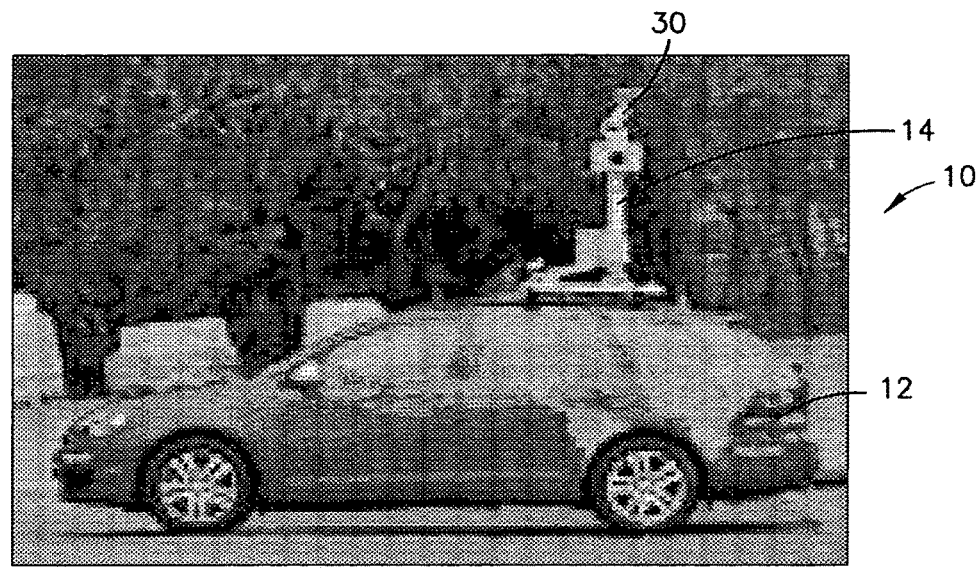
FIG. 1 is a side view of an apparatus comprising features as described herein.

Referring to FIG. 1, there is shown a side view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 in this example comprises a vehicle 12 having an imaging system 14. The imaging system 14 is configured to record images as the vehicle travels. The images are stored in a memory and correlated to the position of the vehicle when the images were taken. However, in alternate example embodiments features as described herein may be used with any suitable camera or camera system. For example, features as described herein may be used in a smartphone having a camera, or in a SLR type of camera.

Figure 2:
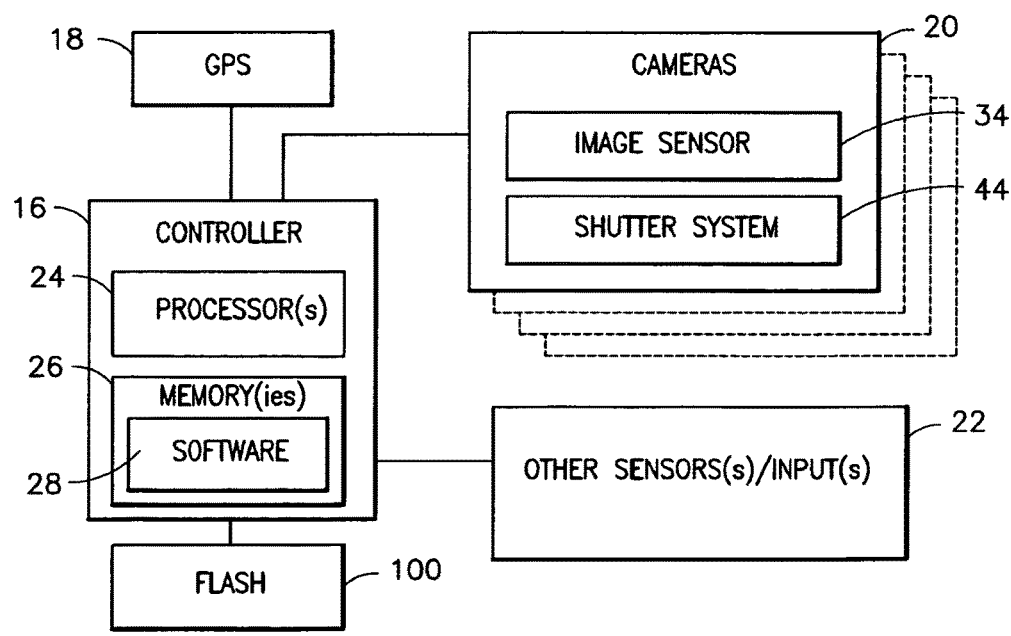
FIG. 2 is a diagram illustrating some of the components of the apparatus shown in FIG. 1.

Referring also to FIG. 2, the imaging system 14 generally comprises a controller 16, a location sensor 18, cameras 20, and other sensors and/or inputs 22. The controller 16 comprises at least one processor 24, such as a microprocessor on a printed wiring board for example, and at least one memory 26. At least one of the memory 26 has software 28. At least one of the memory 26 is configured to store images taken by the camera therein. The location sensor 18 may comprises a GPS for example. In this example the imaging system 14 has four cameras 20 and one or more flash 100. Each camera 20 is pointed in a different direction. More or less than four cameras could be provided. The other sensors/inputs 22 may comprise, for example, a velocity sensor, an accelerometer, a keyboard, a touchscreen, a touchpad or mouse, etc. The apparatus 10 may also comprise a communications unit 30 (see FIG. 1) connected to the controller. The communications unit 30 may be configured to transmit data, such as location information of the vehicle 10 and camera images, wirelessly to a remote location such as a remote server for example. The communications unit 30 may comprise a radio frequency transmitter and receiver for example.

Figure 3:
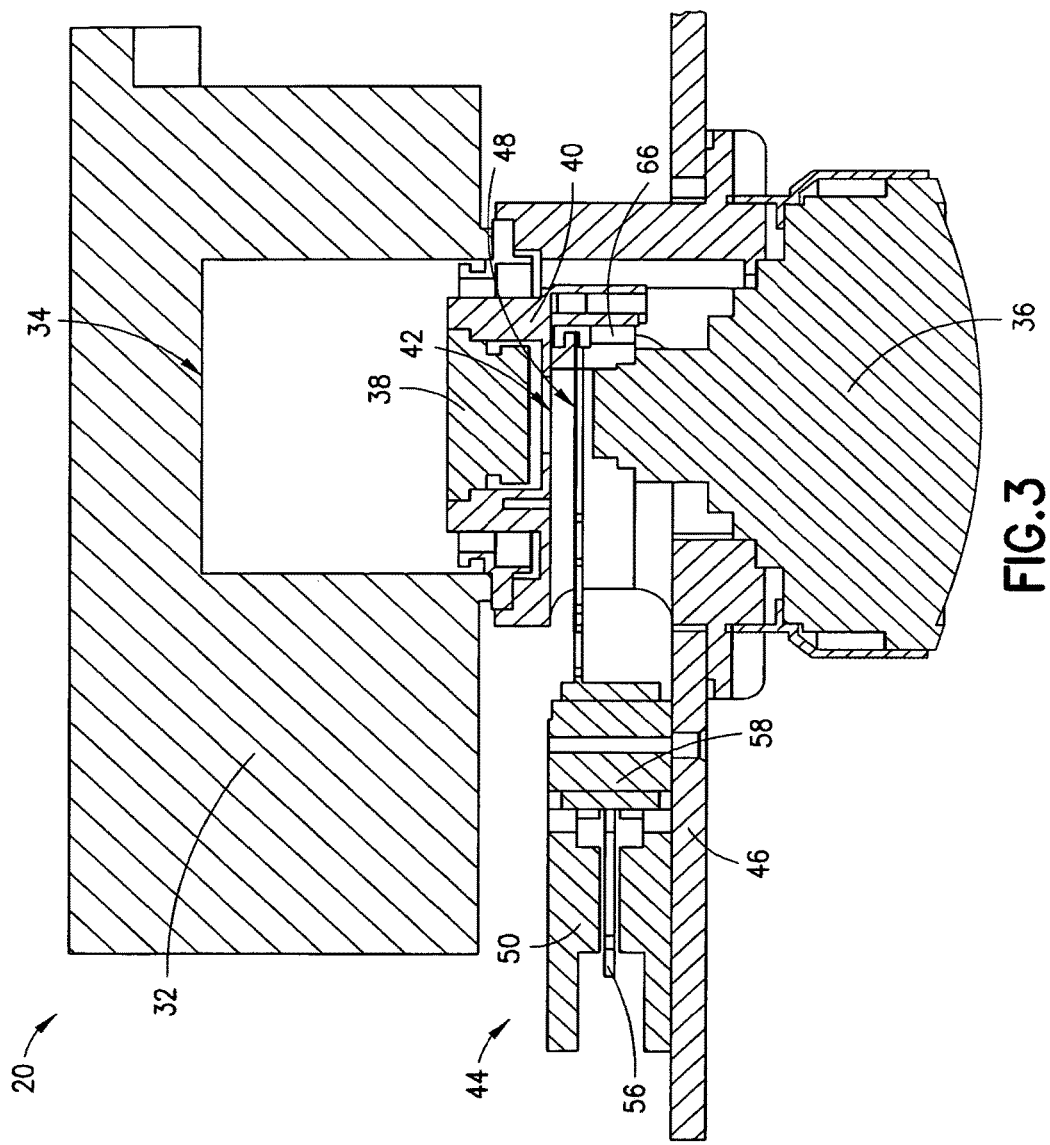
FIG. 3 is a schematic sectional view of one of the cameras shown in FIGS. 1-2.

Referring also to FIG. 3, a schematic sectional view of one of the cameras 20 is shown. In this example embodiment the camera 20 generally comprises a camera body 32, an image sensor 34, front and rear optical elements 36, 38, an aperture member 40 having an aperture therethrough, and a shutter system 44. In this example the aperture 42 has a fixed size and shape. However, in alternate examples the aperture may be able to change its shape/size. In this example the aperture is located between the front and rear optical elements 36, 38. The shutter system 44 is connected to the optical elements 36, 38 by a mounting bracket 46.

Figure 4:
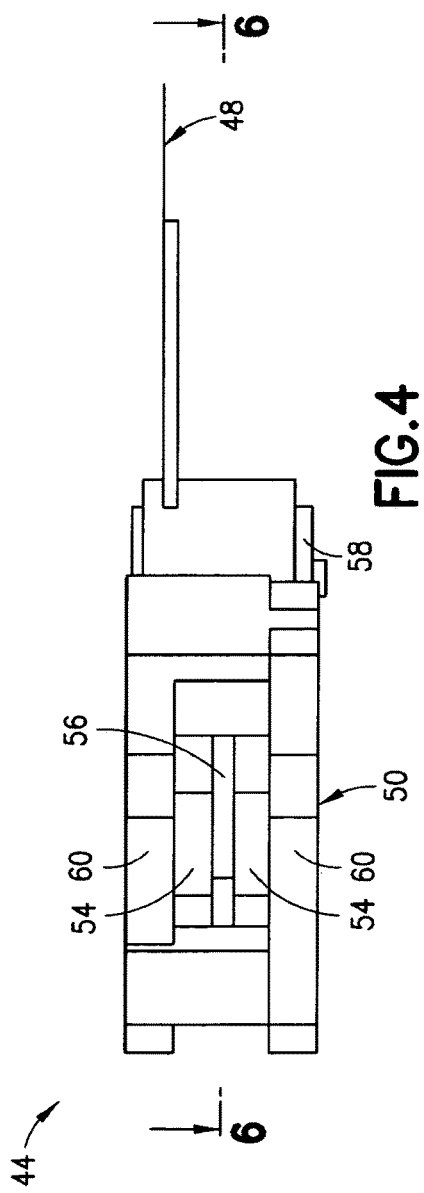
FIG. 4 is a top view of the shutter system shown in FIG. 3.

In this example the shutter system 44 comprises a camera shutter 48 and a shutter drive 50. Referring also to FIGS. 4-6, the shutter 48 has a general flat plate shape with a shutter window 52 therethrough. The shutter window 52 has a fixed size and shape. In this example the window 52 has a general wedge, slit shape. However, in alternate examples other shapes could be provided. The shutter 48 is configured to block light from passing through the aperture 42 from the front optical element(s) 36 except when the shutter window 52 is moved into the optical path between the aperture 42 and the front optical element(s) 36.

The shutter drive 50 generally comprises magnets 54 and a coil 56. The magnets are permanent magnets. However, in an alternate example one or more electromagnets could be provided. The coil 56 is stationarily connected to the camera shutter 48 on an opposite side of a pivot mount 58. The pivot mount 58 is part of a frame of the shutter system 44. The frame is connected to the bracket 46 such that the coil 56 and shutter 48 can rotate about the pivot mount 58. The frame in this example includes back iron 60 and energy absorbing bumpers 62.

In the example embodiment, the coil 56 is a rotary voice coil of a type similar to those used for actuation of read/write heads for hard drives. These actuators typically have one or more permanent magnets which, when coupled with one or more back iron components, create a magnetic circuit which creates a strong magnetic field. The coil 56 may be made of copper or aluminum wire which passes through the magnetic field imparted by the magnets 54 and back iron components 60. This kind of actuator has the beneficial property that the mechanical behavior in response to a given electrical input is consistent across the full range of motion of the actuator. This property makes it possible to design an electrical control which allows the shutter to provide consistent and repeatable exposures. The coil 56 is stationarily connected to the shutter 48 as further described below. The coil 56 is energized in order to move the coil and, thus, move the shutter 48 or, alternatively, to hold the shutter 48 at a stationary location blocking light through the light path, with the coil 56 against either of the bumpers 62.

Figure 5A:
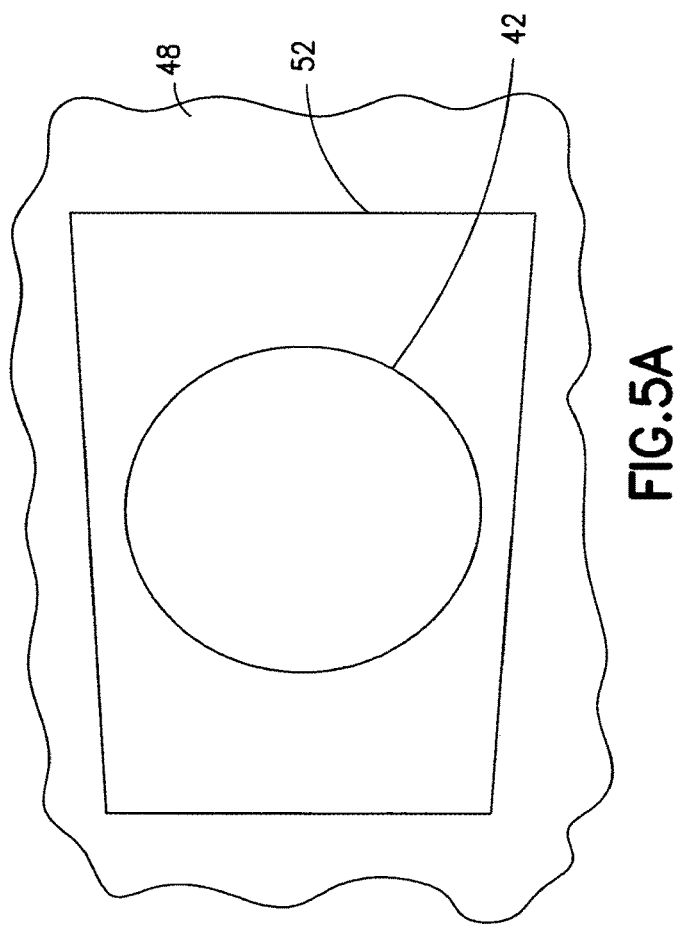
FIG. 5A is a front view of the shutter system shown in FIG. 4.
Figure 6:
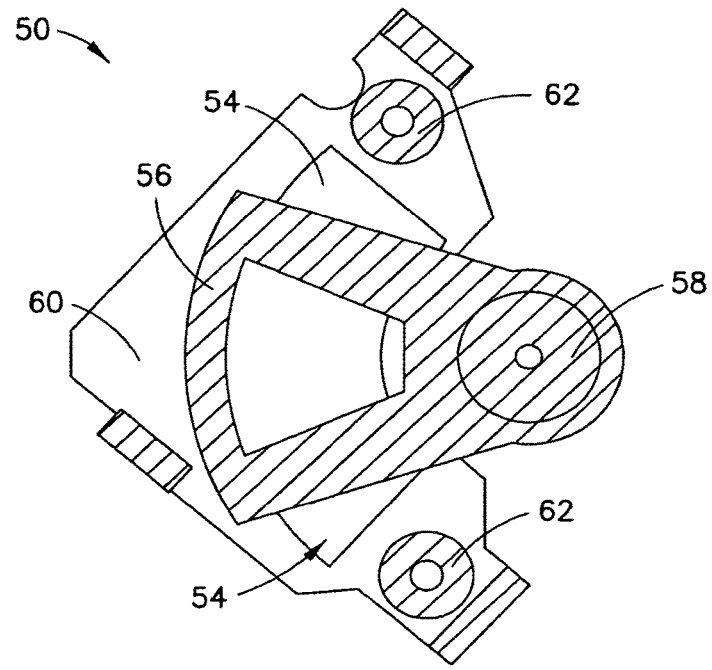
FIG. 6 is a sectional view of the shutter system shown in FIG. 4 taken along line 6-6.

FIG. 5A shows the shutter system from a viewing angle in line with the optical axis. The shutter 48 is made of an opaque, light weight, and adequately stiff material such as aluminum or titanium for example. There is an opening or window 52 which is configured to admit light through the shutter 48. This window 52 is wedge shaped, so that when the shutter 48 is moving at a constant angular velocity, an exposure of equivalent duration is allowed for light travelling through the window 52 at points of varying distances from the pivot 58. The pivot 58 is a bearing which allows the shutter to rotate with low and consistent frictional forces over the life time of the shutter. This bearing is the only point of moving contact between any mechanical components in the shutter system. Thus, with an appropriate choice of the bearing, the mechanical reliability of the shutter system can be very good in comparison to other shutter technologies for still imaging. An appropriate choice of bearing, for example, might be one or two ball bearings, roller bearings, or journal bearings.

Voltage supplied to the coil 56 is controlled by the controller 16. The controller 16 is configured to vary the voltage supplied to the coil 56 based upon factors or parameters such as camera settings and sensor feedback for example. Thus, the controller 16 can control the velocity, direction and duration of movement of the shutter 48 by controlling supply of voltage to the coil 56.

One or more protrusions 64 may be incorporated into the shutter 48. The protrusion(s) 64 may serve as coding for an optical photo-interrupter or sensor 66 (see FIG. 3). The sensor 66 is connected to the controller 16. By measuring the duration with which the protrusion 64 activates the sensor 66, it is possible to measure the angular velocity of the shutter 48. Alternatively, if the shutter 48 is made of a ferromagnetic material, the protrusion(s) 64 might be used for sensing with a gear tooth sensor. In alternate examples, any suitable type of sensor(s) could be used to sense the velocity of the shutter 48. The sensed angular velocity is an indication of the exposure duration. This can be used to tune the electrical control of the rotary voice coil 56 to ensure consistent exposure for example.

The energy absorbing bumpers 62, in this example, are placed at the opposite extremes of the travel of the coil 56 to cushion the impact of the coil at the end of its strokes. Suitable materials for these bumpers may be, but are not limited to, elastomers or polymer foams. This mechanical means of energy absorption may be coupled with an electrical current imparted on the actuator coil 56 to slow it down, and then stop movement, at the end of the strokes.

As seen in FIG. 3, the lens, consisting of a series of one or more optical elements in the front and a series of one or more optical elements in the rear, has the aperture 42 in between the front and rear optical elements. The aperture 42 is the narrowest part of the light path and, therefore, is the preferred location for the shutter window 52 in the lens. The pivot 58 and the actuator components may be located relative to the lens using the bracket 46. During an exposure, light may pass through the rear optical element 38 into the camera body 32, resulting in an image on the surface of the image sensor 34. In this arrangement, a focal plane shutter is not necessary, and if originally present in the camera body it may be removed or disabled so that it will not be a potential cause of mechanical failure.

Figure 7A:
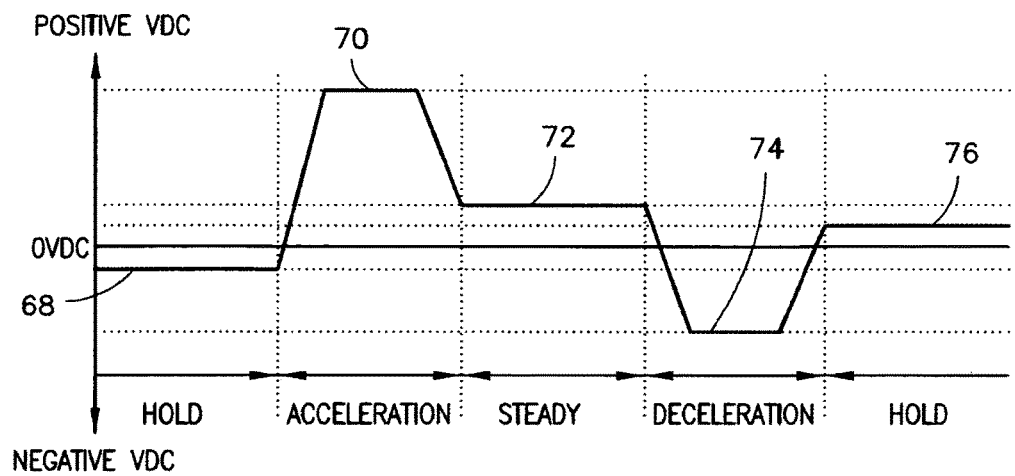
FIGS. 7A-7B are diagrams illustrating an example supply of voltage to the coil of the shutter system shown in FIGS. 3-6.

Referring also to FIG. 7A, a graph of voltage versus time is shown for an example waveform to drive the rotary voice coil 56. At the beginning of an exposure cycle, a small voltage 68 is applied to the coil 56 to assure that it stays at one extreme of the stroke. Thus, the voltage 68 holds the shutter 48 with the shutter window 52 out of alignment with the aperture 42. The shutter 48, thus, blocks light from entering through the aperture 42 to the image sensor 34. A short period before the desired exposure time, a larger voltage pulse 70 is imparted to the coil 56. This may be done with smooth transitions such as a constant slew rate voltage ramp. After the shutter has reached the desired angular velocity, the voltage is reduced to a lower level 72 which is adequate to maintain a constant angular velocity of the shutter 48 through the exposure period. After the shutter window 52 has passed through the light bundle or image path, a voltage pulse of opposite polarity is applied to the coil as indicated by 74 in order to decelerate or reduce the angular velocity of the coil and shutter, such as to near zero for example. After the shutter 48 then comes to rest at the end of its stroke against the opposite bumper 62, a holding voltage 76 is applied to the coil 56 to hold its position until the next exposure event.

Figure 7B:
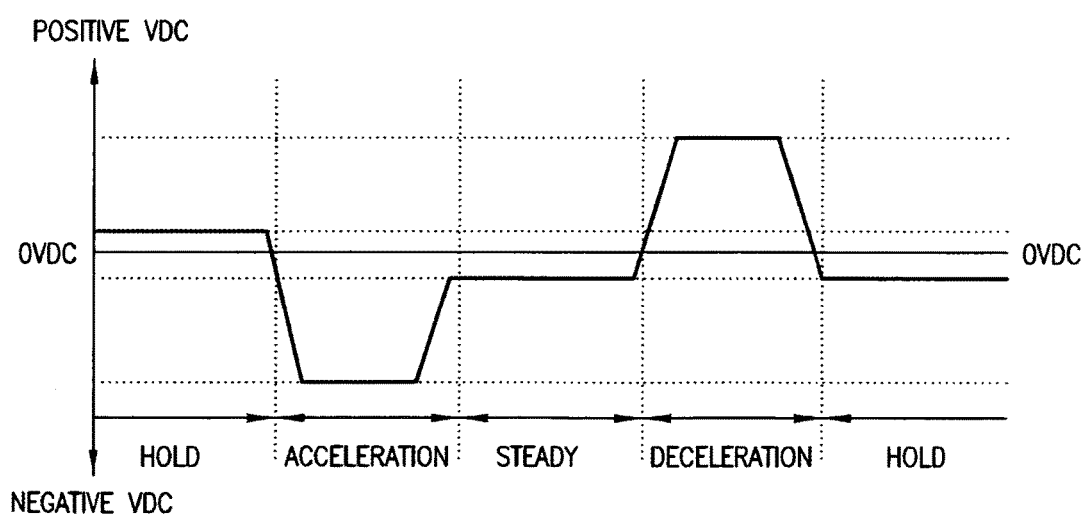

The next shutter event is controlled with an inverted waveform corresponding to the waveform depicted in FIG. 7A applied with opposite polarity. In other words, the voltages would be reversed for the next exposure event to repeat the shutter movement, but in reverse as illustrated by FIG. 7B. This will allow for an exposure event with the shutter moving in the opposite direction. With this design, each motion event of the shutter (in either a first direction or an opposite second direction) corresponds to an exposure during normal operation, with no extraneous motion of the mechanical system.

In another example embodiment, a different waveform could be applied to the coil 56 at the end of each exposure cycle to return it to its initial resting position, so that each exposure would occur with the shutter 48 moving in only one same direction.

The controller 16 may be used to synthesize the voltage waveform illustrated in FIGS. 7A and 7B such as, for example, by means of a digital-to-analog converter, or the use of a pulse width modulated discrete voltage signal of adequately high frequency to approximate a continuous voltage signal. This signal may go to a current amplifier such as an H-bridge, which is capable of switching adequate current and voltage to control the rotary voice coil. Feedback for calibrating the exposure time may be provided to the controller 16 by the photo-interrupter 66. Using this feedback, an automatic calibration algorithm may be implemented on the controller 16, which can compensate for such variables as manufacturing variations and different orientations of the system with respect to gravity.

In one example embodiment, the controller 16 sends an electrical signal to the camera 20 at a precisely timed moment to assure that the shutter 48 is synchronized with the image sensor 34. In another example embodiment, an external host controller independently sends precisely timed signals to the controller 16 and to the camera 20.

Figure 5B:
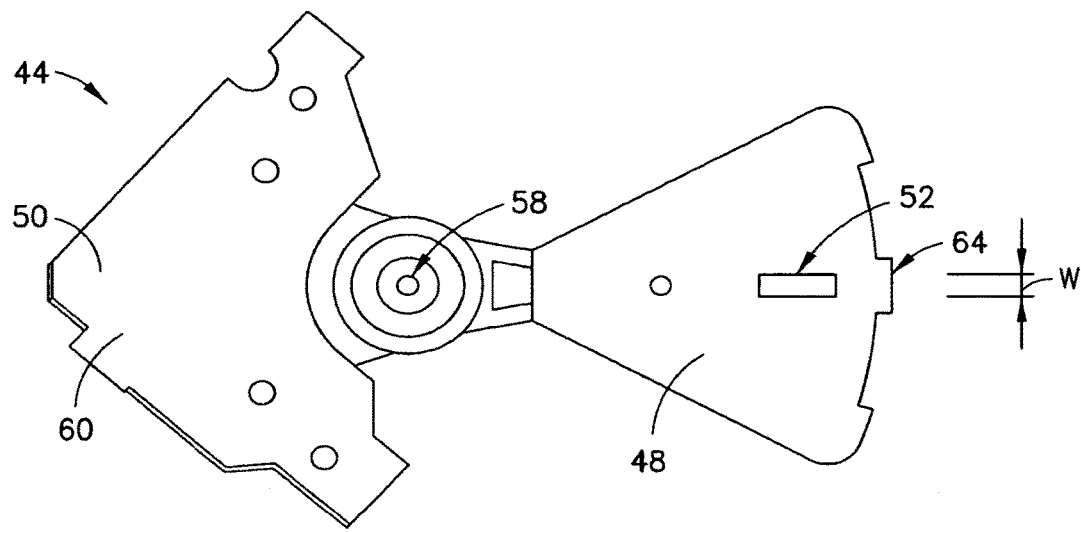
FIG. 5B is a front view of the shutter window aligned with the aperture.

By having a specific set width "W" (see FIG. 5B) for the shutter window 52 using the above described example lens and shutter system, the camera 20 may be used with a flash supplement for mobile mapping in dark places, such as a tunnel for example. Referring also to FIG. 5B , a front view of the shutter 48 at the shutter window 52 is shown when the shutter window 52 is aligned with the aperture 42. The aperture 42 is visible behind the shutter window 52. As can be seen, the four sides of the shutter window 52 are spaced from the sides of the aperture 42. The entire aperture 42 is visible. Because the shutter window 52 is larger than the aperture 42, the shutter 48 does not block any of the aperture 42 at this particular instance in the shutter's movement. The shutter window size may be provided such that a circle slightly larger than the aperture fits entirely within the shutter window 52 to ensure that there is a time where the entire sensor 34 is exposed to a flash 100 (such as a xenon strobe or a pulsed LED for example). A flash such as a xenon strobe or a pulsed LED, for example, is typically active for a much shorter duration than the exposure duration. Choosing a shutter window of this size does not interfere with the function of the shutter without a flash. For the function of the shutter without a flash, the total exposure duration may be increased, which can be compensated for with a lower ISO, a smaller aperture, or a neutral density filter for example, but the duration as it pertains to motion blur does not increase.

An example apparatus may be provided comprising a camera shutter comprising a shutter window therethrough; a shutter drive connected to the camera shutter, where the shutter drive comprises at least one magnet and at least one coil, where the shutter drive is configured to move the camera shutter when the coil is activated; and an aperture member comprising an aperture therethrough, where the shutter window is sized and shaped to be moved into registry with the aperture, and where the shutter window is substantially at least as large as the aperture.

The shutter window may comprise a fixed size and shape. The shutter window may comprise a general wedge shape. The apparatus may comprise a frame, having the camera shutter with the shutter window at a first end, a pivot mount at a middle section of the frame, and the at least one coil connected to an opposite second end. The shutter drive may comprise permanent magnets connected to a bracket, where the pivot mount at the middle section of the frame is pivotably mounted on the bracket. The apparatus may further comprise a controller connected to the coil, where the controller is configured to vary voltage supplied to the coil to control the velocity of the camera shutter. The apparatus may further comprise a velocity sensor connected to the controller, where the velocity sensor is configured to determine velocity of the camera shutter. The controller may be configured to change the velocity of the camera shutter based, at least partially, upon the velocity of the camera shutter sensed by the velocity sensor. The apparatus may further comprise: a frame; a flash connected to the controller; an image sensor connected to the frame, where the image sensor is located to receive light passing through the aperture and the shutter window; at least one camera lens connected to the frame; and at least one memory configured to store an image from the image sensor thereon, where the controller comprises at least one processor, and software on a first one of the at least one of the memory.

Figure 8:
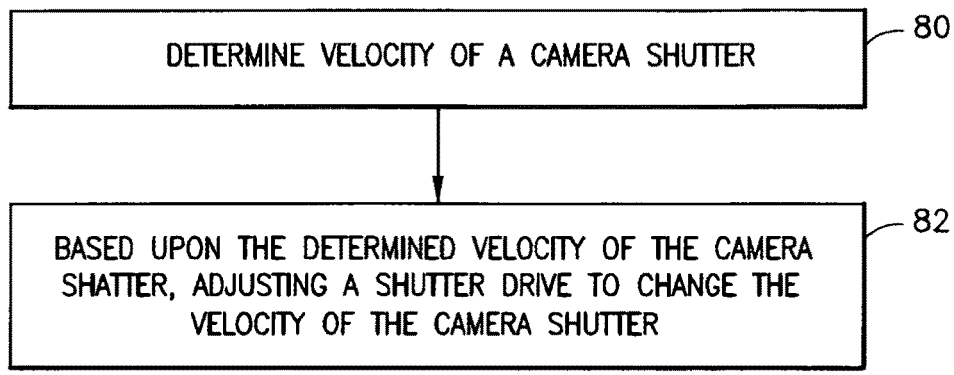
FIG. 8 is a diagram illustrating an example method.

Referring also to FIG. 8, an example method may comprise determining velocity of a camera shutter as indicated by block 80, where the camera shutter comprises a shutter window which is substantially at least as large as a camera aperture; and based upon the determined velocity of the camera shutter, adjusting a shutter drive to change the velocity of the camera shutter as indicated by block 82.

The shutter drive may comprise a coil, and where adjusting the shutter drive comprises adjusting voltage supplied to the coil. The shutter drive may comprise a coil, and where adjusting the shutter drive comprises supplying at least a first voltage to the coil to accelerate the velocity of the camera shutter and at least a second opposite voltage to the coil to decelerate the velocity of the camera shutter. Determining the velocity of the camera shutter may further comprise supplying at least a third voltage to the coil to maintain a substantially constant velocity of the camera shutter. Determining the velocity of the camera shutter may comprise determining a voltage supplied to the coil. The method may further comprise generating a flash, where the velocity of the camera shutter is adjusted such that a substantial entirety of the shutter window is in registry with the camera aperture during substantially an entire duration of the flash. The method may further comprise controlling an exposure duration based, at least partially, upon the determined velocity of the camera shutter.

Figure 9:
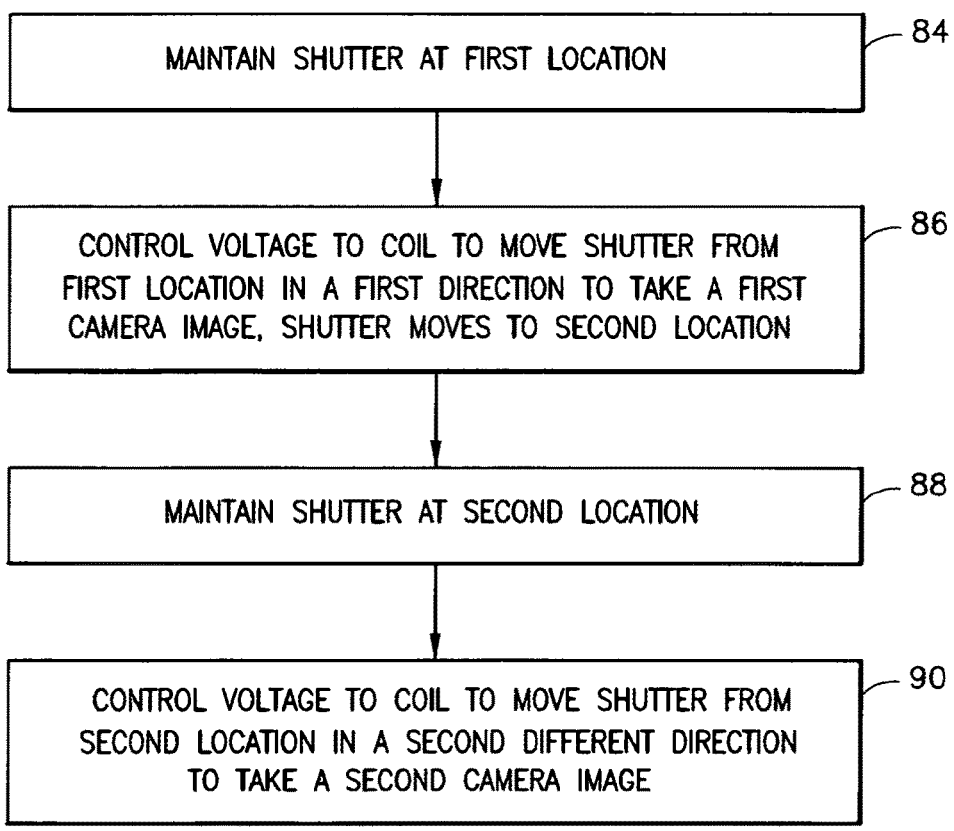
FIG. 9 is a, diagram illustrating an example method.

Referring also to FIG. 9, an example method may comprise maintaining the shutter at first location as indicated by block 84, controlling voltage to the coil to move the shutter from the first location in a first direction to take a first camera image, where the shutter moves to a second location as indicated by block 86, maintaining the shutter at the second location as indicated by block 88, and controlling voltage to the coil to move the shutter from the second location in a second different direction to take a second camera image as indicated by block 90.

An example non-transitory program storage device, such as 26 for example, may be provided readable by a machine, tangibly embodying a program of instructions executable by the machine for performing operations, the operations comprising: determining velocity of a camera shutter; and based upon the determined velocity of the camera shutter, adjusting a shutter drive to change the velocity of the camera shutter.

The shutter drive may comprise a coil, and where adjusting the shutter drive comprises adjusting voltage supplied to the coil, where adjusting the shutter drive comprises supplying at least a first voltage to the coil to accelerate the velocity of the camera shutter and at least a second opposite voltage to the coil to decelerate the velocity of the camera shutter, and where determining the velocity of the camera shutter further comprises supplying at least a third voltage to the coil to maintain a substantially constant velocity of the camera shutter. Determining the velocity of the camera shutter may comprise determining a voltage supplied to the coil. The operations may further comprise generating a flash, where the velocity of the camera shutter is adjusted such that a substantial entirety of the shutter window is in registry with the camera aperture during substantially an entire duration of the flash, and the operations further comprise controlling an exposure duration based, at least partially, upon the determined velocity of the camera shutter.

An example embodiment may be provide in an apparatus comprising means for determining velocity of a camera shutter, where the camera shutter comprises a shutter window which is substantially at least as large as a camera aperture; and means for, based upon the determined velocity of the camera shutter, adjusting a shutter drive to change the velocity of the camera shutter.

An example embodiment may be provide in an apparatus comprising at least one processor 24; and at least one non-transitory memory 26 including computer program code 28, the at least one memory and the computer program code configured to, with the at least one processor, cause the apparatus to: determine velocity of a camera shutter, where the camera shutter comprises a shutter window which is substantially at least as large as a camera aperture; and based upon the determined velocity of the camera shutter, adjust a shutter drive to change the velocity of the camera shutter.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
    a camera shutter comprising a shutter window therethrough;
    a shutter drive connected to the camera shutter, where the shutter drive comprises at least one magnet and at least one coil, where the shutter drive is configured to move the camera shutter when the coil is activated;
    an aperture member comprising an aperture therethrough, where the shutter window is sized and shaped to be moved into registry with the aperture, and where the shutter window is substantially at least as large as the aperture; and
    a controller connected to the coil, where the controller is configured to vary voltage supplied to the coil to control the camera shutter at a first location to take a first camera image and at a second location to take a second camera image.
2. An apparatus as in claim 1 where the shutter window has a fixed size and shape.
3. An apparatus as in claim 2 where the shutter window has a general wedge shape.
4. An apparatus as in claim 1 where the apparatus comprises a frame, having the camera shutter with the shutter window at a first end, a pivot mount at a middle section of the frame, and the at least one coil connected to an opposite second end.
5. An apparatus as in claim 4 where the shutter drive comprises permanent magnets connected to a bracket, where the pivot mount at the middle section of the frame is pivotably mounted on the bracket.
6. An apparatus as in claim 1, where the controller is configured to vary voltage supplied to the coil to control a velocity of the camera shutter.
7. An apparatus as in claim 6 further comprising a velocity sensor connected to the controller, where the velocity sensor is configured to determine the velocity of the camera shutter.
8. An apparatus as in claim 7 where the controller is configured to change the velocity of the camera shutter based, at least partially, upon the velocity of the camera shutter sensed by the velocity sensor.
9. An apparatus as in claim 6 further comprising:
    a frame;
    a flash connected to the controller;
    an image sensor connected to the frame, where the image sensor is located to receive light passing through the aperture and the shutter window;
    at least one camera lens connected to the frame; and
    at least one memory configured to store an image from the image sensor thereon,
    where the controller comprises at least one processor, and software on a first one of the at least one of the memory.
10. A method comprising:
    determining velocity of a camera shutter, where the camera shutter comprises a shutter window which is substantially at least as large as a camera aperture;
    based upon the determined velocity of the camera shutter, adjusting a shutter drive to change the velocity of the camera shutter;
    maintaining the camera shutter at a first location;
    controlling voltage to a coil to move the camera shutter from the first location in a first direction to take a first camera image, where the shutter moves to a second location, maintaining the shutter at the second location; and
    controlling voltage to the coil to move the shutter from the second location in a second different direction to take a second camera image.
11. A method as in claim 10 where adjusting the shutter drive comprises adjusting voltage supplied to the coil.
12. A method as in claim 10 where adjusting the shutter drive comprises supplying at least a first voltage to the coil to accelerate the velocity of the camera shutter and at least a second opposite voltage to the coil to decelerate the velocity of the camera shutter.
13. A method as in claim 12 where determining the velocity of the camera shutter further comprises supplying at least a third voltage to the coil to maintain a substantially constant velocity of the camera shutter.
14. A method as in claim 10 where determining the velocity of the camera shutter comprises determining a voltage supplied to the coil.

15. A method as in claim 10 further comprising generating a flash, where the velocity of the camera shutter is adjusted such that a substantial entirety of the shutter window is in registry with the camera aperture during substantially an entire duration of the flash.

16. A method as in claim 15 further comprising controlling an exposure duration based, at least partially, upon the determined velocity of the camera shutter.

17. A non-transitory program storage device readable by a machine, tangibly embodying a program of instructions executable by the machine for performing operations, the operations comprising:
   determining velocity of a camera shutter; and based upon the determined velocity of the camera shutter;
   adjusting a shutter drive to change the velocity of the camera shutter;
   maintaining the camera shutter at a first location;
   controlling voltage to a coil to move the camera shutter from the first location in a first direction to take a first camera image, where the shutter moves to a second location, maintaining the shutter at the second location; and
   controlling voltage to the coil to move the shutter from the second location in a second different direction to take a second camera image.

18. A non-transitory program storage device as in claim 17 where adjusting the shutter drive comprises adjusting voltage supplied to the coil, where adjusting the shutter drive comprises supplying at least a first voltage to the coil to accelerate the velocity of the camera shutter and at least a second opposite voltage to the coil to decelerate the velocity of the camera shutter, and where determining the velocity of the camera shutter further comprises supplying at least a third voltage to the coil to maintain a substantially constant velocity of the camera shutter.

19. A non-transitory program storage device as in claim 17 where determining the velocity of the camera shutter comprises determining a voltage supplied to the coil.

20. A non-transitory program storage device as in claim 17 where the operations further comprise generating a flash, where the velocity of the camera shutter is adjusted such that a substantial entirety of the shutter window is in registry with the camera aperture during substantially an entire duration of the flash, and the operations further comprise controlling an exposure duration based, at least partially, upon the determined velocity of the camera shutter.

* * * * *